United States Patent
Luo et al.

(10) Patent No.: US 8,748,732 B2
(45) Date of Patent: Jun. 10, 2014

(54) SOLAR GENERATOR APPARATUS WITH SUSPENDING SUPPORTS

(75) Inventors: Chia Ching Luo, Hsinchu County (TW); Yao Hua Sung, Tainan (TW)

(73) Assignees: Topper Sun Energy Technology Co., Ltd., Hukou Township, Hsinchu County (TW); Chia-Ching Luo, Hukou Township, Hsinchu County (TW)

( * ) Notice: Subject to any disclaimer, the term of this patent is extended or adjusted under 35 U.S.C. 154(b) by 416 days.

(21) Appl. No.: 13/179,854

(22) Filed: Jul. 11, 2011

(65) Prior Publication Data
US 2013/0014804 A1    Jan. 17, 2013

(51) Int. Cl.
H01L 31/042    (2014.01)
F24J 2/54    (2006.01)

(52) U.S. Cl.
CPC ........... *H01L 31/0422* (2013.01); *F24J 2/5431* (2013.01)
USPC .......................................... 136/246; 136/244

(58) Field of Classification Search
CPC ........................... H01L 31/0422; F24J 2/5431
USPC .................... 136/243–265; 250/200
See application file for complete search history.

(56) References Cited

U.S. PATENT DOCUMENTS

| | | | | |
|---|---|---|---|---|
| 4,172,739 A | * | 10/1979 | Tassen | 136/246 |
| 4,476,853 A | * | 10/1984 | Arbogast | 126/578 |
| 2010/0276570 A1 | | 11/2010 | Moser | |

FOREIGN PATENT DOCUMENTS

| | | | |
|---|---|---|---|
| JP | S6270454 U | | 5/1987 |
| JP | 2004235188 A | | 8/2004 |
| JP | 2005-317588 | | 1/2005 |
| JP | 2005-090889 | | 4/2005 |
| JP | 2010-230604 | | 10/2010 |
| KR | 20-2009-0009733 | * | 9/2009 |
| TW | 200918836 A | | 5/2009 |
| TW | 201000837 A | | 1/2010 |
| WO | WO-2009/076394 A1 | | 6/2009 |
| WO | WO2010/085592 A2 | | 7/2010 |

OTHER PUBLICATIONS

English translation of Yoon, Korean Publication No. 20-2009-0009733.*

* cited by examiner

*Primary Examiner* — Jeffrey T Barton
*Assistant Examiner* — Niki Bakhtiari
(74) *Attorney, Agent, or Firm* — Muncy, Geissler, Olds & Lowe, P.C.

(57) ABSTRACT

A solar generator apparatus, which has suspending supports and is mounted on a fixed structure, includes a solar generator module, a middle column, three side columns and three elastic members. The solar generator module converts light into electricity. The middle column for rotatably supporting the solar generator module has a first end mounted on the fixed structure, and a second end pivotally connected to a middle portion of a bottom of the solar generator module. First ends of the three side columns are mounted on the fixed structure. The three elastic members for assisting in supporting the solar generator module respectively connect second ends of the three side columns to the solar generator module.

10 Claims, 4 Drawing Sheets

SOLAR GENERATOR APPARATUS WITH SUSPENDING SUPPORTS

BACKGROUND OF THE INVENTION

1. Field of the Invention

The invention relates in general to a solar generator apparatus with suspending supports, and more particularly to a solar generator apparatus using a middle column and elastic members to support a solar generator module.

2. Related Art

Usually, a solar generator system is mounted on a building or at a fixed manner, and cannot be adjusted according to the azimuth angle of the sun, so that the received availability of the solar energy is limited. Alternatively, a wind-solar hybrid generator system has a cylinder for supporting a wind power generator, and a solar generator module, which is usually very small and is mounted on the cylinder. Because the middle portion of the solar generator module is directly and slantingly fixed to the cylinder, the solar generator module may be damaged by the strong wind if its area is too large. Thus, the conventional solar generator system still has to be improved.

SUMMARY OF THE INVENTION

It is an object of the invention to provide a solar generator apparatus capable of stably supporting a solar generator module using a middle column and elastic members.

To achieve the above-identified object, the invention provides a solar generator apparatus, which is mounted on a fixed structure and includes a solar generator module, a middle column, three side columns and three elastic members. The solar generator module converts light into electricity. The middle column has a first end mounted on the fixed structure, and a second end pivotally connected to a middle portion of a bottom of the solar generator module, and rotatably supports the solar generator module. The three side columns have first ends mounted on the fixed structure. The three elastic members respectively connect second ends of the three side columns to the solar generator module, and assist in supporting the solar generator module.

Accordingly, the solar generator apparatus with suspending supports according to the invention can have the stable support, and is thus suitable for the large generator application, can be rotated and moved with multiple degrees of freedom to track the sun, and can be adapted to various applications to effectively enhance the received availability of the solar energy.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understandable from the detailed description given hereinbelow and the accompanying drawings which are given by way of illustration only, and thus are not limitative of the present invention.

DETAILED DESCRIPTION OF THE INVENTION

The following term "connection" includes, without limitation to, direct connection or indirect connection.

Figure 1:
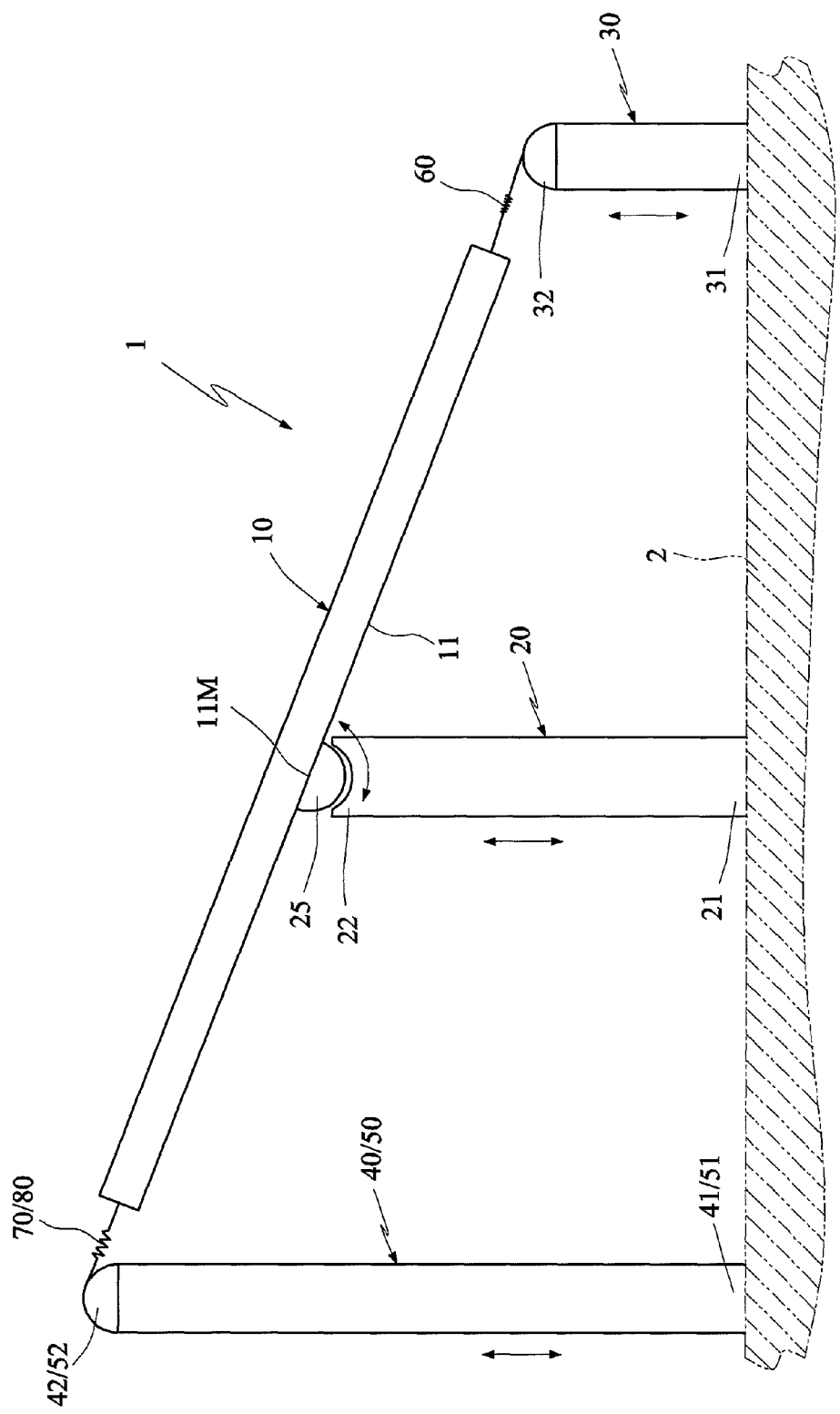
FIG. 1 is a side view showing a solar generator apparatus according to a preferred embodiment of the invention.
Figure 2:
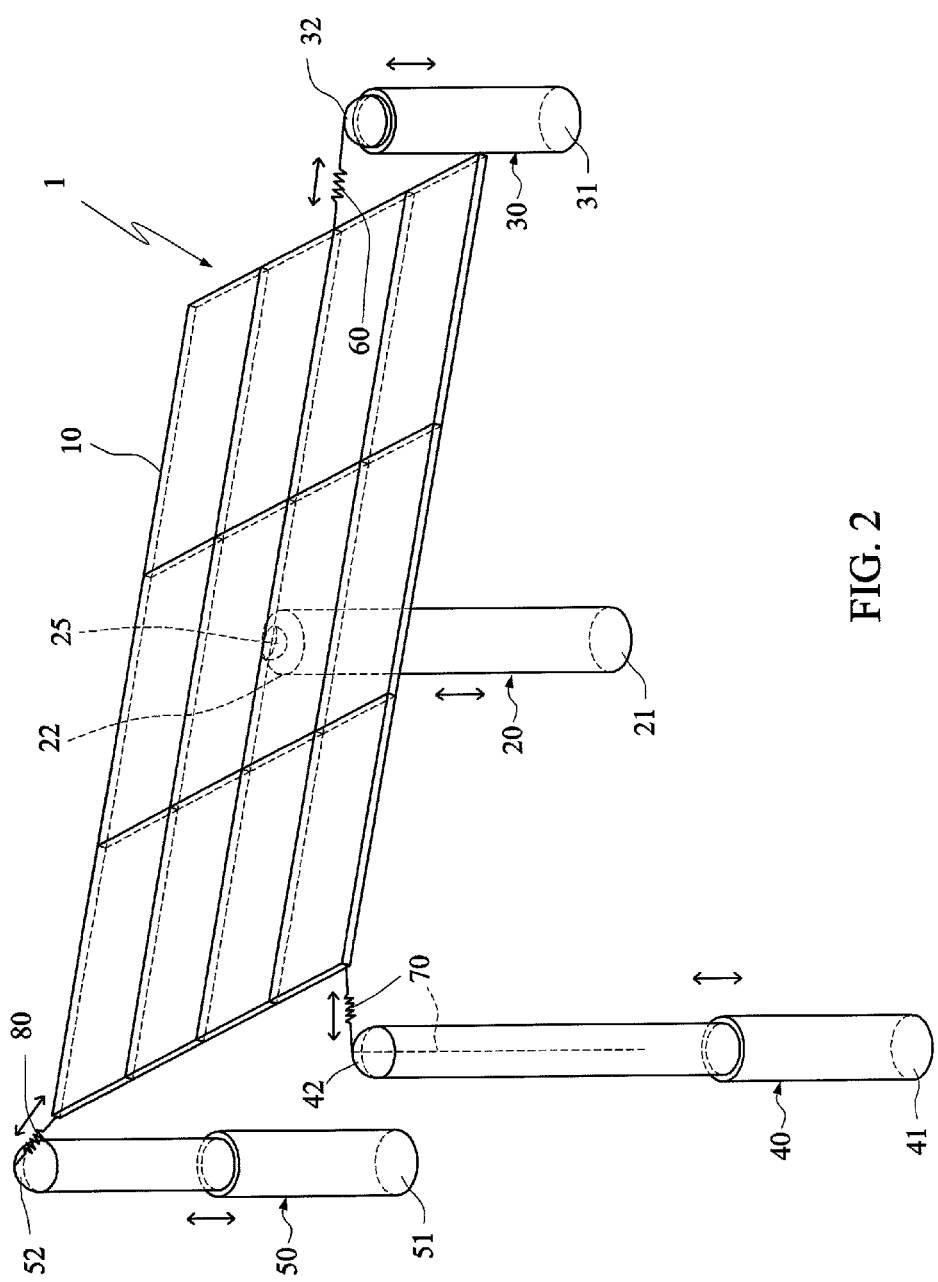
FIG. 2 is a pictorial view showing the solar generator apparatus according to the preferred embodiment of the invention.

FIG. 1 is a side view showing a solar generator apparatus 1 according to a preferred embodiment of the invention. FIG. 2 is a pictorial view showing the solar generator apparatus 1 according to the preferred embodiment of the invention. Referring to FIGS. 1 and 2, the solar generator apparatus 1 of this embodiment is mounted on a fixed structure 2. The solar generator apparatus 1 includes a solar generator module 10, a middle column 20, three side columns 30, 40 and 50 and three elastic members 60, 70 and 80.

The solar generator module 10 converts, for example, the solar light into electricity.

The middle column 20 has a first end 21 mounted on the fixed structure 2 and a second end 22 pivotally connected to a middle portion 11M of a bottom 11 of the solar generator module 10, and rotatably supports the solar generator module 10. The middle portion 11M is preferably disposed at or near the center of gravity of the solar generator module 10, and the position of the middle portion 11M is not particularly restricted. The middle column 20 is retractable in length but may also have the fixed length. In this embodiment, the second end 22 of the middle column 20 is pivotally connected to the middle portion 11M of the bottom 11 of the solar generator module 10 through a universal joint 25. The universal joint 25 includes a ball and a spherical concave portion working in conjunction with the ball, and is well known in the art, so detailed descriptions thereof will be omitted. As a result, the solar generator module 10 may be rotated freely about the universal joint 25, and the user can easily adjust the arrangement or position angle of the solar generator module 10 to track the sun.

The three side columns 30, 40 and 50 respectively have first ends 31, 41 and 51 mounted on the fixed structure 2, which may be the building, floor or the like. The three side columns 30, 40 and 50 are retractable in length. That is, the three side columns 30, 40 and 50 have adjustable heights.

The three elastic members 60, 70 and 80 are respectively connected to second ends 32, 42 and 52 of the three side columns 30, 40 and 50 and the solar generator module 10 and assist in supporting the solar generator module 10 to provide the stable supporting effect. The three elastic members 60, 70 and 80 are retractable in length. In this embodiment, each elastic member 60/70/80 is composed of a cable and a spring connected together. For example, the elastic member 70 may be pulled into the side column 40. Similarly, the elastic member 60/80 may also pulled into the side column 30/50 (not shown). A mechanism, such as a winding motor, may be disposed inside the side column 30/40/50 to control the length and the pulling force of the elastic member 60/70/80. Alternatively, the elastic member 60/70/80 may be adjusted manually. It is to be noted that the elastic member may be replaced with an elastic cable without affecting the function of the invention.

Figure 3:
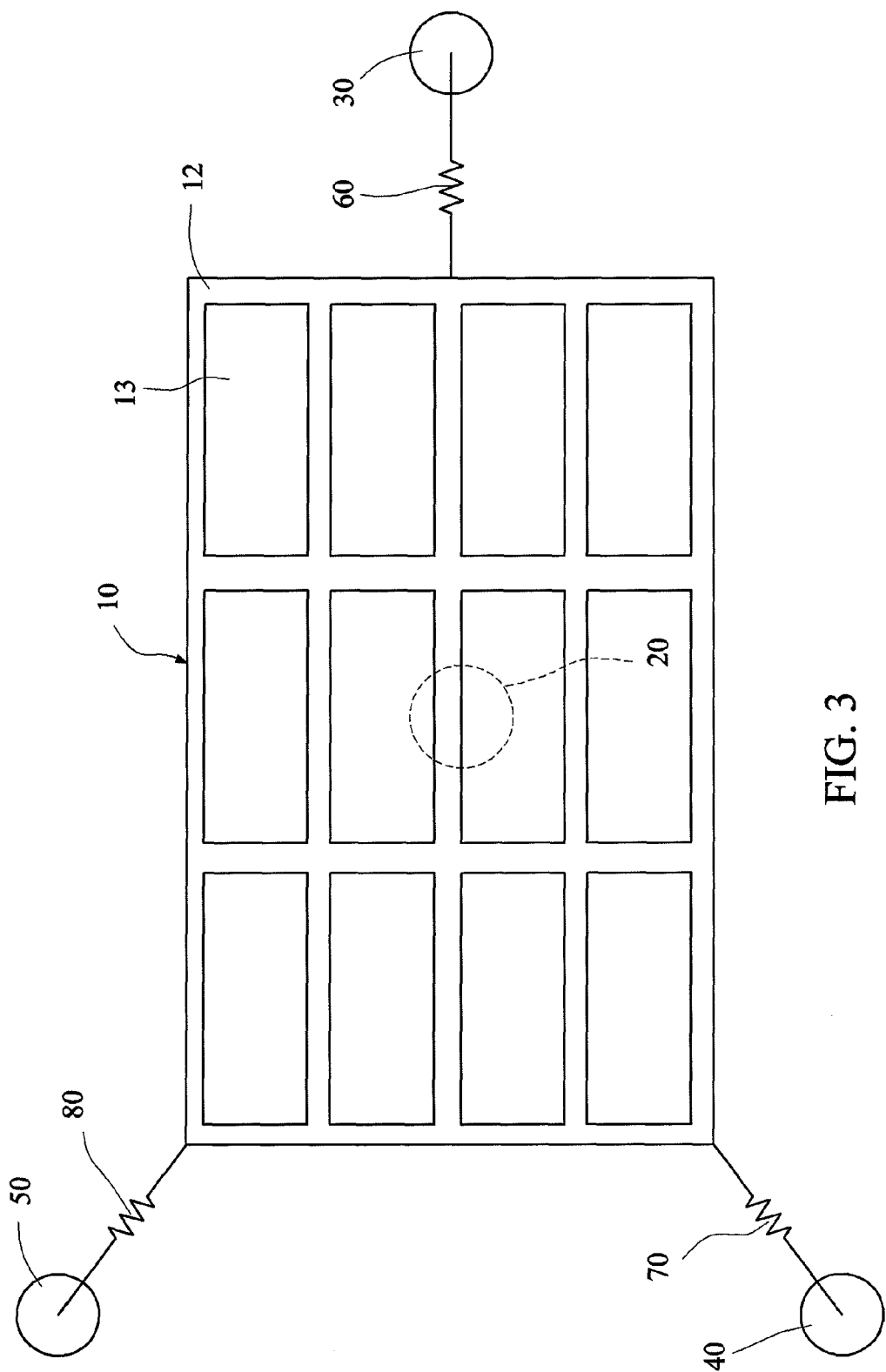
FIG. 3 is a top view showing the solar generator apparatus according to the preferred embodiment of the invention.

FIG. 3 is a top view showing the solar generator apparatus 1 according to the preferred embodiment of the invention.

Referring to FIG. 3, the solar generator module 10 includes a frame 12 and multiple solar panels 13. It is to be noted that the invention is not limited thereto, and the number of the solar panel 13 may be equal to one. The frame 12 is connected to the three elastic members 60, 70 and 80 and the middle column 20. The solar panel 13 is mounted on the frame 12. As shown in FIGS. 1 to 3, the projection areas of the second ends 32, 42 and 52 of the three side columns 30, 40 and 50 on the fixed structure 2 are located outside a projection area of the solar generator module 10 on the fixed structure 2.

Figure 4:
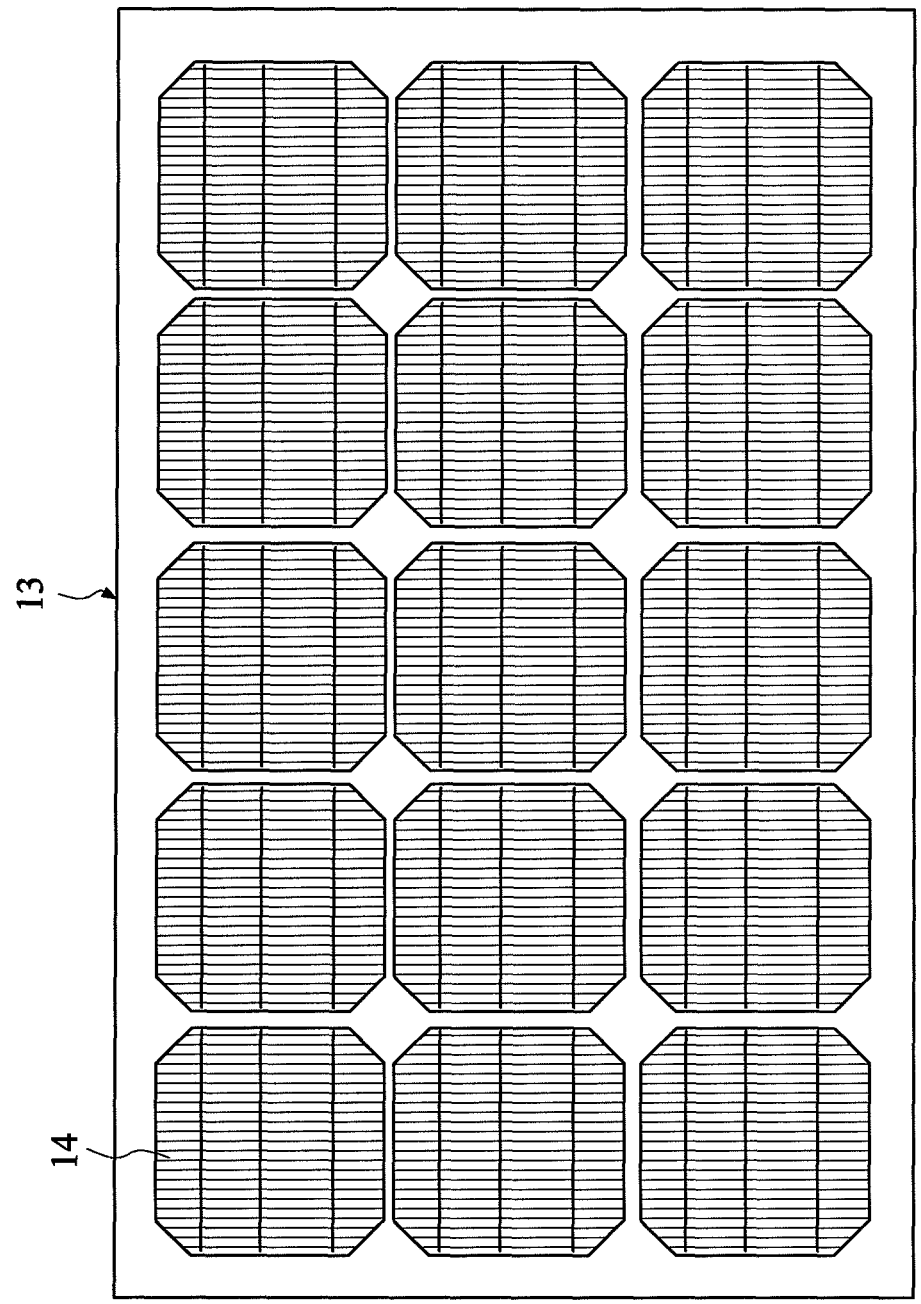
FIG. 4 is a top view showing a solar panel of the solar generator apparatus according to the preferred embodiment of the invention.

FIG. 4 is a top view showing the solar panel 13 of the solar generator apparatus 1 according to the preferred embodiment of the invention. As shown in FIG. 4, each solar panel 13 includes solar cells 14 connected in parallel and/or in series. The solar cell 14 may be a single-crystal solar cell, a poly-crystalline solar cell, a film solar cell or any other type of solar cell.

In addition to the use of the winding motor or the manpower, the pulling forces of the elastic members 60, 70 and 80 may be controlled by adjusting the lengths of the three side columns 30, 40 and 50, respectively. Each side column may include two sectors that can be screwed together. Rotating one of the two sectors relatively to the other can adjust the length of the side column. That is, the lengths and elastic forces of the three elastic members 60, 70 and 80 can be changed by adjusting the lengths of the three side columns 30, 40 and 50.

Thus, the solar generator apparatus with suspending supports according to the invention can have the stable support, and is thus suitable for the large generator application, can be rotated and moved with multiple degrees of freedom to track the sun, and can be adapted to various applications to effectively enhance the received availability of the solar energy.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A solar generator apparatus mounted on a fixed structure, the solar generator apparatus comprising:
    a solar generator module for converting light into electricity;
    a middle column, which has a first end mounted on the fixed structure and a second end pivotally connected to a middle portion of a bottom of the solar generator module, and rotatably supports the solar generator module;
    three side columns having first ends mounted on the fixed structure; and
    three elastic members, which respectively connect second ends of the three side columns to the solar generator module, and assist in supporting the solar generator module, wherein projection areas of the second ends of the three side columns on the fixed structure are located outside a projection area of the solar generator module on the fixed structure.

2. The solar generator apparatus according to claim 1, wherein the solar generator module comprises:
    a frame connected to the three elastic members and the middle column; and
    a solar panel mounted on the frame.

3. The solar generator apparatus according to claim 1, wherein the solar generator module comprises:
    a frame connected to the three elastic members and the middle column; and
    solar panels mounted on the frame.

4. The solar generator apparatus according to claim 3, wherein each of the solar panels comprises solar cells connected together.

5. The solar generator apparatus according to claim 1, wherein the second end of the middle column is pivotally connected to the middle portion of the bottom of the solar generator module through a universal joint.

6. The solar generator apparatus according to claim 5, wherein the universal joint comprises a ball.

7. The solar generator apparatus according to claim 1, wherein the middle column is retractable.

8. The solar generator apparatus according to claim 1, wherein the three side columns are retractable.

9. The solar generator apparatus according to claim 1, wherein the three elastic members are retractable.

10. The solar generator apparatus according to claim 1, wherein each of the elastic members comprises a cable and a spring connected together.

* * * * *